United States Patent
Rice

[11] Patent Number: 5,855,635
[45] Date of Patent: Jan. 5, 1999

[54] NON-BLOCKING FILTER

[75] Inventor: Patrick E. Rice, Lake Villa, Ill.

[73] Assignee: Jason, Inc., Milwaukee, Wis.

[21] Appl. No.: 934,345

[22] Filed: Sep. 19, 1997

[51] Int. Cl.$^6$ ................................................. B01D 39/10
[52] U.S. Cl. ............................... 55/486; 55/487; 55/520; 55/525; 55/527; 55/DIG. 5
[58] Field of Search ............................. 55/525, 527, 487, 55/486, 520, DIG. 5; 280/739, 740, 742

[56] References Cited

U.S. PATENT DOCUMENTS

| | | |
|---|---|---|
| 2,218,007 | 10/1940 | Miller . |
| 2,919,765 | 1/1960 | Kasten . |
| 2,989,145 | 6/1961 | Goodloe . |
| 4,105,724 | 8/1978 | Talbot . |
| 4,154,688 | 5/1979 | Pall . |
| 4,317,727 | 3/1982 | Meissner . |
| 4,664,684 | 5/1987 | Dunn et al. . |
| 4,881,307 | 11/1989 | Gaissmaier . |
| 5,030,256 | 7/1991 | Lingle . |
| 5,064,459 | 11/1991 | Unterforsthuber et al. ............... 55/527 |
| 5,102,436 | 4/1992 | Grabowski . |
| 5,114,448 | 5/1992 | Bartilson . |
| 5,224,974 | 7/1993 | Johnson . |
| 5,284,586 | 2/1994 | DeSalvo . |
| 5,308,370 | 5/1994 | Kraft et al. ................................ 55/525 |
| 5,503,806 | 4/1996 | Fulmer et al. ........................... 422/164 |
| 5,589,067 | 12/1996 | Rice . |
| 5,665,131 | 9/1997 | Hock et al. ................................ 55/525 |
| 5,702,494 | 12/1997 | Tompkins et al. ......................... 55/527 |

OTHER PUBLICATIONS

Keene Products from Metalex®, A Division of The Koller Group, Inc., *A guide for specifying premium quality expansion and control joints, casing and corner beads, drip screed and other trim products*, pp. 1–8.

Metalex, Manufacturing of Quality Expanded Metal, pp. 1–12.

Otto H. York Company, Inc., Demister®.

*Primary Examiner*—Jay H. Woo
*Assistant Examiner*—Minh-Chau T. Pham
*Attorney, Agent, or Firm*—Welsh & Katz, Ltd.

[57] ABSTRACT

A filter is provided. The filter includes a first layer of a non-blocking screen and a second layer of the non-blocking screen disposed against and in direct contact with the first layer, said first and second layers together forming a filter.

12 Claims, 3 Drawing Sheets

NON-BLOCKING FILTER

FIELD OF THE INVENTION

The field of the invention relates to filters and more particularly to filters used in automotive airbags.

BACKGROUND OF THE INVENTION

Automotive airbags are known. Such airbags are designed to deploy inside a passenger compartment of an automobile during collisions to protect the occupants from injury.

In order to protect occupants from injury during high speed collisions, an airbag must deploy to occupy a passenger space between the passenger and source of impact. Further, before deployment, an airbag must be small enough to compactly fit within the upholstery of a protected automobile.

The airbag must deploy very rapidly also be reliable. After installation, the airbag must be capable of reliably deploying years later without the necessity of regular maintenance.

Airbags used today, typically include (as main operative components) a polyester airbag and inflation source. The inflation source is typically an ignitable gas generating material that is triggered upon detection of impact by a collision detector.

Once the gas generating material is ignited, the material burns very quickly, in turn generating a sufficient volume of gas to quickly deploy and fill the airbag. Within a few milliseconds, the gas generating material burns itself out and the airbag deflates.

In order to function properly, the gas generating material must be contained in a housing capable to tolerating the heat of combustion. Further, because of the speed of combustion and materials used, molten slag is frequently generated during the combustion process by the gas generating material. The slag must be filtered from the gas stream to avoid melting and causing failure of the polyester airbag during deployment.

Prior art airbag inflators have used metallic housings to contain the gas generating material. Ceramic filters have been disposed in a gas path to contain slag and reduce a gas temperature. While prior art airbag inflators have proved effective, they are heavy, bulky and relatively expensive to produce. Accordingly, a need exists for a filter for an airbag inflator which is relatively light and inexpensive to produce, but which provides the porosity and filtering characteristics of ceramic.

SUMMARY

A filter is provided. The filter includes a first layer of a non-blocking screen and a second layer of the non-blocking screen disposed against and in direct contact with the first layer, said first and second layers together forming a filter.

DETAILED DESCRIPTION

Figure 1:
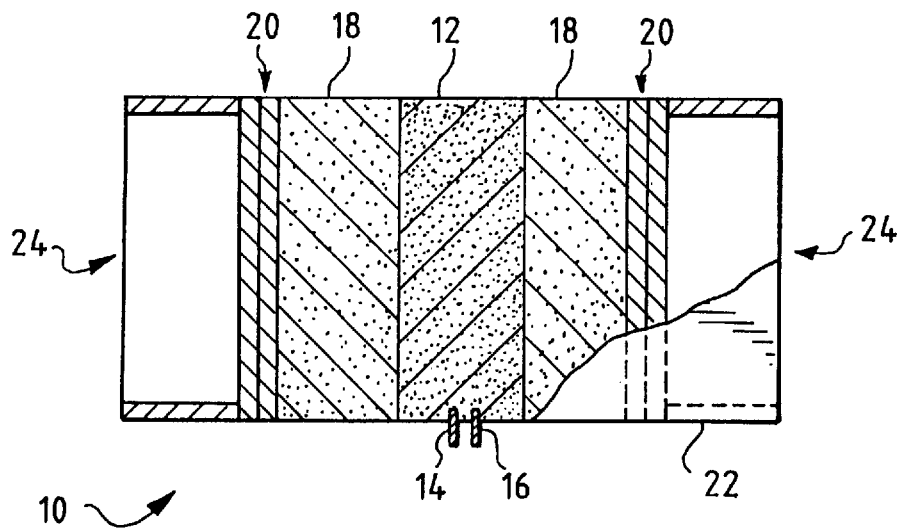
FIG. 1 depicts a cut-away side-view of an airbag inflator under an embodiment of the invention.

FIG. 1 depicts a cut-away side-view of an airbag inflator 10, generally, in accordance with an embodiment of the invention. Included within the inflator 10 is an initiator 12, gas generating material 18, filter 20 and outer housing 22.

The initiator 12 may contain an electrically ignitable pyrotechnic material. A pair of connectors 14, 16 are provided for connection to a collision detector (not shown) for purposes of triggering the airbag inflator 10.

Surrounding the initiator 12 may be a quantity of gas generating material 18. The gas generating material may be of any appropriate gas generating composition in an appropriate form (e.g., disks, pellets, etc.), which ignites upon the triggering of the initiator 12. Gas outlets 24 around a periphery of the inflator 10 function to route the gas to the airbag (not shown).

Although many suitable gas generating materials could be used, some gas generating material (e.g., sodium azide) are known to produce hot particles, including molten metal slag during combustion. Under an illustrated embodiment, a double layer non-blocking filter 20 is used to filter and contain the particles and to cool the gas. The filter 20 has been found to inherently have the strength necessary to resist the explosive nature of airbag inflation, yet reliably capture particulate.

Figure 2:
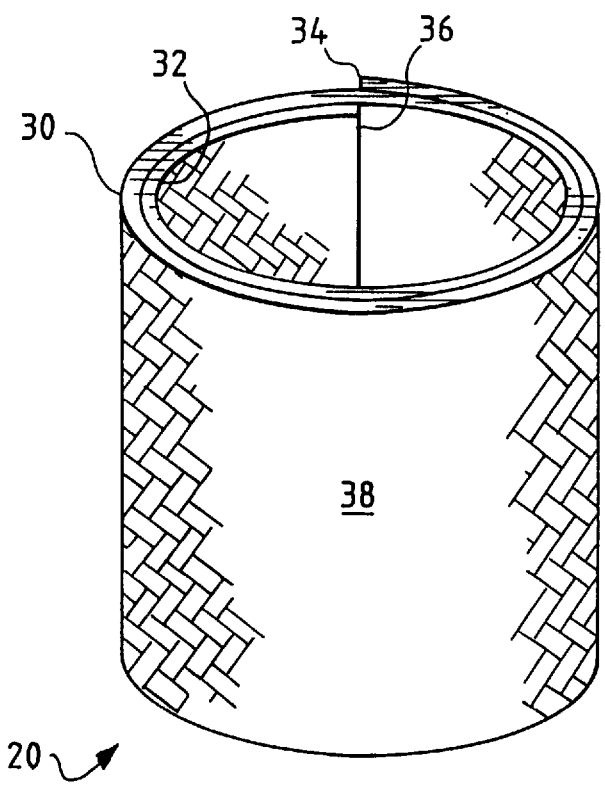
FIG. 2 depicts a perspective view of a filter of the inflator of FIG. 1.

FIG. 2 is a perspective view of the non-blocking filter 20. It is contemplated that the non-blocking filter 20 would be fabricated having a number of layers (e.g., 2 or more) of screening material. Each of the layers of screening material would provide a formed filter structure having non-blocking fluid flow characteristics when placed against similar filter structures.

Under an illustrated embodiment, the filter 20 is made up of a first layer 30, with a second layer 32 of filter material disposed against the first layer. The two layers 30, 32 may be formed of a single strip of material 38 rolled into an annular shape with the opposing ends 34, 36 secured to the adjacent layer. Where the material is metallic, the ends 34, 36 may be secured by tack welding into the annular shape shown in FIG. 2. While it is contemplated that the filter 20 may be fabricated of a specific size for airbag inflators (e.g., 1¼ high by ½ inch in diameter), the filter 20 may have much larger dimension (e.g., up to 11 inches high by 6 inches diameter) in other applications.

Under the illustrated embodiment, the strip of material 38 may be formed of expanded metal. The strip of material 38 (formed as described below) has been found to have utility as a non-blocking filter for fluids when a first layer is disposed against and in direct contact with a second layer. The term non-blocking as used herein is intentionally meant to be descriptive of, and limited to, the general form of expanded material structures substantially as described below.

The strip of material 38 may be cut from an expanded strip of sheet metal 40 (FIG. 4), from which the filter structure 20 may be fabricated. The strip of expanded sheet metal 40 may be made from a continuous strip of sheet metal 42 that has been expanded in such a way as to resist filter blockage caused by intimate contact between the layers 30, 32 during use.

Figure 3:
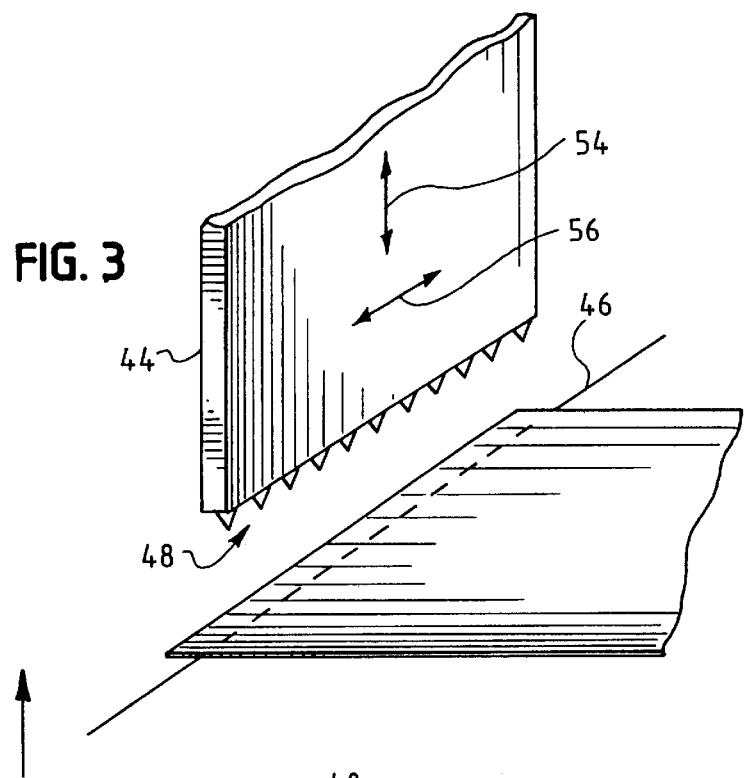
FIG. 3 depicts a metal forming punch used for forming the non-blocking filter of FIG. 1.
Figure 5:
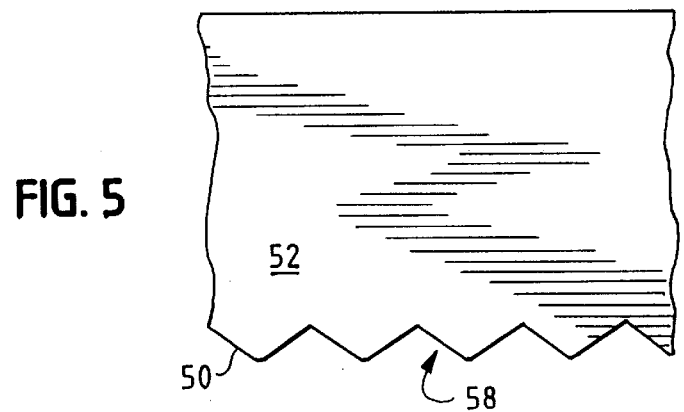
FIG. 5 depicts a front-view of the punch of FIG. 3.

Under the embodiment, the expanded metal 40 and filter structure 20 may be made by using a stamping press (the die 44 and shear edge 46 of which are shown in FIG. 3). Under the embodiment, the cutting edge 48 of the die 44 is composed of a number of triangular cutting points 50, the details of which are shown in FIG. 5.

The sheet metal 42 used for fabrication of the expanded metal filter screen 40 may be relatively thin (e.g., 0.010–0.065 inch) and may be made of an appropriate material for filtering a particular fluid (e.g., carbon steel, non-ferrous alloys, plastic, etc.) or of a less expensive material with an appropriate coating (e.g., plastic, tin, etc.).

To create the expanded metal 40 of the filter structure 20, the sheet metal 42 is advanced through the stamping press (cutting die 44 and shear edge 46) at a relatively slow rate per die stroke (e.g., 0.017–0.020 inch).

On each alternate vertical stroke (54, FIG. 3), the die 44 is offset horizontally (56, FIG. 3) to produce a non-blocking filter structure 40 that does not block filter fluid flow during use. Under the embodiment, the offset is of a distance greater than zero inches and less than one-half the spacing (0.1876 inch) of the triangular cutting points 50. Alternately, the die 44 may be offset a multiple of one-half the spacing plus a distance greater than zero and less than one half the spacing of the triangular cutting points 50. Under a preferred embodiment, in fact, the die is offset by the fractional value of the spacing of the points 50 on alternate vertical strokes 54.

Figure 4:
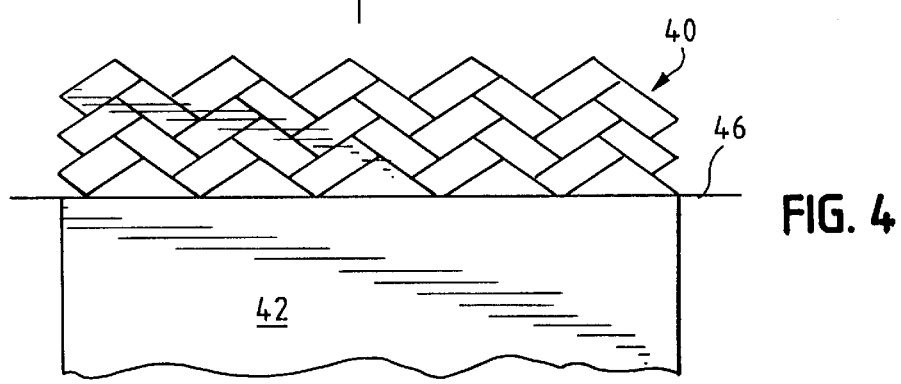
FIG. 4 depicts the non-blocking expanded metal formed by the punch of FIG. 3.

FIG. 4 shows a simplified sketch of the appearance of the expanded metal 40 of the filter structure 20 as it progresses past the shear edge 46. As can be observed from FIG. 4 the apertures created by the triangular cutting points 50 have a shape that is generally twice as long as wide and present the general appearance of a herringbone design.

Following expansion of the sheet metal 42 within the stamping die, the expanded metal 40 may be leveled in a rolling operation and coiled for easier processing in subsequent operations, or used directly, The expanded metal may also be annealed to improve workability. Whether coiled and/or heat treated or not, the expanded metal 40 may be formed (e,g., on a mandrel) and tack or resistance welded to provide the annular filter support structure 20 shown in FIG. 2. To obtain maximum workability, the expanded metal 38 is formed into the circular shape shown along an axis parallel to the original stamping operation (i.e., parallel to the shear edge 20 of FIG. 4).

Figure 6:
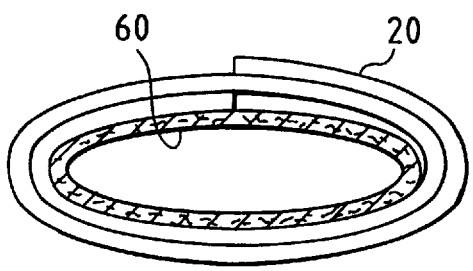
FIG. 6 depicts a non-blocking filter of FIG. 1 under an alternate embodiment.

In another illustrated embodiment of the invention (FIG. 6), the non-blocking filter 20 is used in conjunction with a fibrous filter media 60. As shown, the fibrous filter media is disposed inside the non-blocking filter 20 and provides a pre-filtering function, where clogging of the non-blocking filter 20 may occur due to the generation of molten slag from the gas generating material.

The fibrous filter material 60 be formed of a relatively dense material capable of sustaining high temperatures. Such fibrous filter material 60 may also be of a material (e.g., fiberglass, steel wool, etc.) expected to resist the effects of high pressure differentials for short periods, in addition to high temperature.

Figure 7:
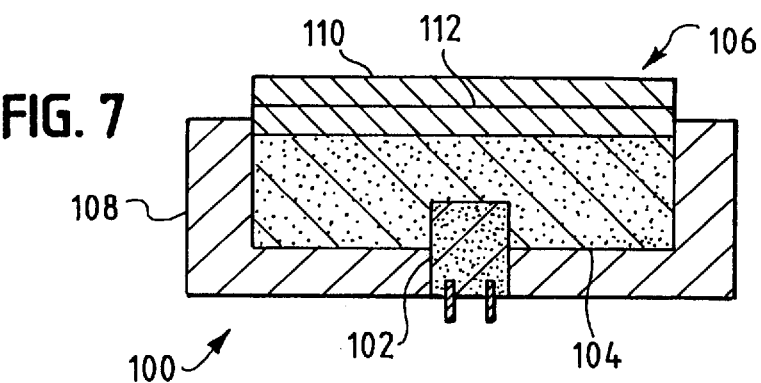
FIG. 7 depicts the airbag inflator and filter of FIG. 1 under an alternate embodiment.

In another illustrated embodiment of the invention (FIG. 7), the airbag inflator 100 may be fabricated with a gas discharge along a single side (e.g., the top as shown in FIG. 7), with the non-blocking filter 106 disposed along that single side. Under the illustrated embodiment, a housing 108 includes an initiator 102 and a gas generating material 104.

Figure 8:
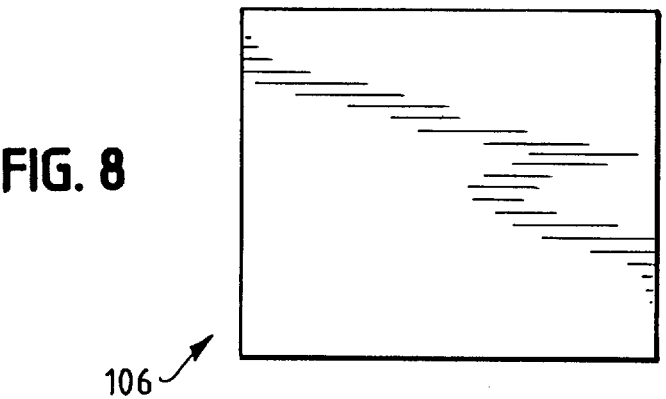
FIG. 8 depicts a top view of the filter of FIG. 1.

The housing 108 of the airbag inflator 100 may be fabricated in the form of a cylinder with a discharge at one end of the cylinder or rectilinear in shape. Where the housing 108 of the airbag inflator 100 is rectilinear, the non-blocking filter 106 may also have a rectilinear shape as shown in FIG. 8.

As with previous embodiments, the non-blocking filter 106 may be fabricated with a first layer 110 of material 40 disposed against a second layer 112 of the material 40. As described above, the material may be used in the as-expanded form or the material 40 may be leveled before assembly into the filter 106.

In another alternate embodiment, the filter 106 may have uses in applications not only where the filter 106 cools the gas and captures particulate, but also where the cooling of the gas causes condensation of airborn contaminates. Such applications of the filter 106 may include grease filters or fractional distillation processes.

A specific embodiment of novel methods and apparatus of providing an airbag filter according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

I claim:

1. A filter comprising;

a first layer of a non-blocking expanded metal screen; and a second layer of the non-blocking expanded metal screen substantially identical to the first layer disposed against and in direct contact with the first layer, said first and second layers together forming a filter.

2. The apparatus as in claim 1 wherein the expanded metal of the first and second non-blocking screens further comprises a plurality of apertures where a longitudinal axis of each aperture is parallel to a longitudinal axis of every other aperture and each aperture is laterally offset along the longitudinal axis from adjacent apertures.

3. The apparatus as in claim 2 wherein the lateral offset of adjacent apertures of the expanded metal further comprises an integer multiple of one-third of a hold spacing.

4. The apparatus as in claim 1 wherein the first and second non-blocking screens further comprise carbon steel.

5. The apparatus as in claim 1 wherein the first and second non-blocking screens further comprise a non-ferrous alloy.

6. The apparatus as in claim 1 wherein the first and second layer of non-blocking screen further comprise an annular ring.

7. An apparatus for filtering a gas generating air bag inflator, such apparatus comprising:

a first layer of a non-blocking expanded metal screen; and a second layer of the non-blocking expanded metal screen substantially identical to the first layer disposed against the first layer, said first and second layers together forming a filter which filters a gaseous output of the gas generating air bag inflator.

8. The apparatus as in claim 7 wherein the expanded metal screens of the first and second non-blocking screens further comprises a plurality of apertures where a longitudinal axis of each aperture is parallel to a longitudinal axis of every other aperture and each aperture is laterally offset along the longitudinal axis from adjacent apertures.

9. The apparatus as in claim 8 wherein the lateral offset of adjacent apertures of the expanded metal further comprises an integer multiple of one-third of a hole spacing.

10. The apparatus as in claim 7 wherein the first and second non-blocking screens further comprise a carbon steel.

11. The apparatus as in claim 7 wherein the first and second non-blocking screens further comprise a non-ferrous alloy.

12. The apparatus as in claim 7 wherein the first and second layer of non-blocking screen further comprise an annular ring.

\* \* \* \* \*